United States Patent [19]
Shino et al.

[11] Patent Number: 4,512,983
[45] Date of Patent: Apr. 23, 1985

[54] METHOD FOR MAKING A SANITARY DRINK

[76] Inventors: Kunihiko Shino, Sakae-cho 17, Nerima-ku, Tokyo, 176; Tamiji Matoba, 59, Tomei-cho 5-chome, Chikusa-ku, Nagoya-shi, 464, both of Japan

[21] Appl. No.: 426,458

[22] Filed: Sep. 29, 1982

[51] Int. Cl.³ .................... A61K 35/78; A61K 31/70; A23F 3/00
[52] U.S. Cl. ................................. 424/195.1; 426/597
[58] Field of Search ................. 424/195, 180; 426/597

[56] References Cited

PUBLICATIONS

Portions as set forth in p. 333 of the World Encyclopedia published in Japan on Apr. 25, 1972, by Heibonsha of 4, 4 bancho, Chiyoda-ku, Tokyo, Japan.
Portions as set forth in p. 25 of the Universal Encyclopedia published in Japan on Oct. 10, 1972, by Shogakukan of 2-3-1, Hitotsubashi, Chiyoda-ku, Tokyo, Japan.
Page 504 of *All About Tea*, by William H. Ukers, M. A., New York, The Tea and Coffee Trade Journal Company—1935.
Index and p. 38 of *Food Technology*, a publication of The Institute of Food Technologists—Mar. 1981.
Pages 510-512 of *Flora of Japan*, by Jisaburo Ohwi, National Science Museum, Tokyo, Japan—Smithsonian Institution, Washington, D.C., 1965.

*Primary Examiner*—Albert T. Meyers
*Assistant Examiner*—John W. Rollins
*Attorney, Agent, or Firm*—Flynn, Thiel, Boutell & Tanis

[57] ABSTRACT

A method of making a sanitary drink is disclosed in which a certain type of fungi of basidiomycetes belonging to the family Polyporaceae and hydrangea tea are used as starting materials and extracted with water in an amount of several times to several tens times that of the mixture at a predetermined temperature. The resulting extract is rendered acidic by the use of an organic acid and allowed to stand at a low temperature, thereby permitting insoluble matter to precipitate. The insoluble matter is separated from the extract system and the resulting filtrate is thermally sterilized after charging into a suitable container.

14 Claims, No Drawings

METHOD FOR MAKING A SANITARY DRINK

BACKGROUND OF THE INVENTION

1. Field of the Invention

This invention relates to sanitary drinks, and more particularly, to a method for making a sanitary drink of the type which comprises extracts of a certain type of fungi of basidiomycetes belonging to the family Polyporaceae and hydrangea tea.

2. Prior Art

In most known healthful or sanitary foods, it is usual to place stress on the pharmaceutical effect of effective ingredients at the expense of the taste of the food itself. We have made extensive stuides to utilize effective components of a certain type of fungi belonging to the family Polyporaceae and hydrangea tea while taking into account the problem of taste of food.

SUMMARY OF THE INVENTION

It is accordingly an object of the present invention to provide a method for making a sanitary drink which comprises extracts of fungi of basidiomycetes belonging to the family Polyporaceae and hydrangea tea.

It is another object of the invention to provide a sanitary drink which comprises an extract from fungi of basidiomycetes belonging to the family Polyporaceae which contains germanium bonded to an organic compound (hereinafter referred to as an organic germanium compound or substance) and polysaccharides, and an extract from hydrangea tea which contains an organic germanium compound.

The above objects can be achieved, according to the present invention, by a method for making a sanitary drink which comprises mixing a mushroom or fungus of basidiomycetes belonging to the family Polyporaceae or its dried product and hydrangea tea or its dried product, adding water in an amount of several times to several tens times by weight greater than that of the mixture, subjecting the mixture to an extraction treatment at a temperature of 50° to 150° C. for a time sufficient for the extraction, adding an organic acid in an amount sufficient to render the mixture acidic, allowing the mixture to stand at a temperature higher than the freezing point thereof but lower than a temperature at which the extract decays, separating the resulting insoluble matters from the mixture, and thermally sterilizing the resulting filtrate. The drink obtained according to the invention can be served as it is or after concentration for drinking purposes with or without addition of sweetenings.

DETAILED DESCRIPTION OF THE INVENTION in the practice of the invention, the mushroom, i.e. fungi of basidiomycetes, belonging to the family Polyporaceae is that which contains polysaccharides and organic germanium substances which have been scientifically proved as showing various physiological activities including anti-cancer action on animals including human beings. Typical of the fungi are, for example, *Coriolus versicolor* (Fr.) Quel., *Ganoderma lucidum* (Fr.) Karst. and the like.

In general, polysaccharides which stimulate the immune system of a living body and exhibit various physiological activites including the anti-cancer action include polysaccharides such as a hemicellulose fraction isolated from various plants, bamboo grasses, fungi, bagasse, lichens and the like, and lipopolysaccharides such as from yeasts and bacteria. However, these polysaccharides show their effect only when injected intraperitoneally or intravenously, so that it is difficult to employ them as food. The polysaccharide present in fungi such as *Coriolus versicolor* or *Ganoderma lucidum* has the advantage of exhibiting efficacy even through oral administration. Additionally, these polysaccharides have no toxicity, irrespective of administration route, and can thus be utilized effectively as a sanitary food.

The hydrangea tea prepared from the leaves of the plant *Hydrangea macrophylla Seringe* var. *thumbergii* belonging to the family Saxifragaceae is widely known not only as a private drug effective in treating diabetes, but also as a starting material for the tea of heaven which is drunk at the celebration of the anniversary of Buddha's birth on April 8. This tea is one of the plants which contain plenty of an organic germanium substance or substances. The organic germanium substance will induce interferon in blood even when dosed orally, activating macrophages and NK cells to produce the anti-pernicious neoplasm effect. Moreover, the organic germanium substance serves to inactivate a certain type of potential protein Kinase of cancer cells.

In Japan, which is going towards a highly advanced age community as will never have been experienced in any countries in Europe, the number of aged who wish to work healthfully until death or who are given up by their physician will increase more and more. Further, there is the fact that more than 50% of local finance is occupied by medical expenses, and hence it is necessary to reduce such expenses. In this sense, provision of a tasteful sanitary drink which has the effective physiological activities of polysaccharides and organic germanium substances of *Corious versicolor* or *Ganoderma lucidum* and also of an organic germanium substance of the hydrangea tea, whose efficacy in a living body have been scientifically or traditionally proved, is considered to coincide with social needs.

We have made extensive studies on sanitary drinks and succeeded in developing a tasteful sanitary drink which is obtained by mixing fungi of basidiomycetes belonging to the family Polyporaceae and hydrangea tea, subjecting the mixture to the specific extraction treatment, adding an organic acid and, optionally, sweetenings such as honey, unrefined sugar and the like. The mixing ratio of the fungi and the hydrangea tea is generally in the range of 3:1 to 1:3, preferably 1:1 on a weight basis.

The mixture of the fungi and the hydrangea tea is extracted by adding thereto water in an amount of several to several tens times as great as that of the mixture and heated at a temperature of from 50° to 150° C. for several minutes or more. In general, the amount of water is 5 to 20 times by weight that of the mixture. The resulting extract is found to contain polysaccharides and organic germanium substances in abundance. To the extract is added an organic acid which is harmless to human begins and includes, for example, citric acid, l-ascorbic acid, succinic acid or the like. The organic acid is added in an amount of 0.1 to 2 wt% of the total composition or to such a level that the extraction system is adjusted to a pH range below 7, preferably below 5. Then, the extract system is agitated and allowed to stand at a low temperature ranging from 0° to 10° C., preferably about 1° to 3° C. for a long time of over 10 hours or overnight, by which insoluble matter is permitted to precipitate. The insoluble matter is organic compounds or substances including proteins and can be readily removed from the extract by a centrifugation using a Sharpless centrifugal separator, for example, at 8000 to 20000 r.p.m. The resulting glossy reddish, clear yellowish brown extract may be charged into a suitable container such as a glass bottle as it is or after concentration to a suitable level of concentration by a concentrator and thermally sterilized as usual to give a drink product.

The present invention is particularly described by way of the following examples.

EXAMPLE 1

1 kg of an air-dried product of Coriolus versicolor and 1 kg of an air-dried product of hydrangea tea were mixed together, to which was added 10 liters of water, followed by heating at 60° C. for 10 hours while agitating. Thereafter, the mixture was filtered by means of a filter cloth to separate into an extract and a residue. As a result, there was obtained 7 liters of the extract. The residue was washed with 3 liters of water and the washing and the extract were combined together to make a total volume of 10 liters. To the 10 liters extract was added 50 g of a powder of citric acid, which was agitated for dissolution, followed by being allowed to stand overnight in an ice room at 1° C. thereby permitting insoluble matter to precipitate and the extract to age. The extract was separated by a centrifugal separator to remove the insoluble matter therefrom. This 10 liters of extract was charged into 10 brown bottles each having a volume of 1 liter, thermally sterilized at 85° C. for 30 minutes and tightly stoppered to obtain a bottled drink.

EXAMPLE 2

1.5 kg of an air-dried product of Ganoderma lucidum and 0.5 kg of an air-dried product of hydrangea tea were mixed, to which was added 30 liters of water, followed by heating to 80° C. for 3 hours while agitating. Then, the mixture was separated by means of a filter cloth into an extract and a residue to obtain 27 liters of the extract. The residue was washed with 3 liters of water and the resulting washing and the extract were combined together to make a total volume of 30 liters. The extract was concentrated to ⅓ in volume by means of a concentrator, to which were added 20 g of l-ascorbic acid powder, 20 g of citric acid powder and 20 g of succinic acid powder and agitated for dissolution. The resulting solution was allowed to stand for a day and a night in an ice chamber at 3° C., thereby permitting insoluble matter to precipitate and the extract to age. The extract system was subjected to the separation by means of a centrifugal separation to remove the insoluble matter therefrom. The resulting extract with a volume of 10 liters was admixed with 2 kg of honey under agitation to obtain a solution. This solution was charged into 900 cc bottles, thermally sterilized at 90° C. for 15 minutes, and each bottle was tightly stoppered to obtain a bottled product.

What is claimed is:

1. A method for the preparation of a beverage, which comprises:

mixing (1) basidiomycetes fungus of the family Polyporaceae and containing polysaccharides and organic germanium substances, with (2) hydrangea tea, to prepare a starting mixture thereof;

adding water to said starting mixture in an amount of from 5 to 20 times the weight of said starting mixture to obtain an aqueous mixture;

heating said aqueous mixture at a temperature in the range of 50° C. to 150° C. for a time period sufficient to extract, into the aqueous phase, water-soluble substances comprising polysaccharides and organic germanium compounds from said fungus and said tea;

removing solids from said aqueous mixture to thereby obtain an aqueous extract;

adding an organic acid which is physiologically harmless to human beings to said extract in an amount sufficient to reduce the pH of said extract to below 7;

allowing said extract to stand at a temperature higher than the freezing point thereof but lower than the temperature at which said extract begins to decay for a period sufficient to allow insoluble matter to precipitate from said extract;

removing said precipitated insoluble matter from said extract; and heating said extract to thermally sterilize said extract, thereby forming said beverage.

2. A method according to claim 1, further comprising adding a sweetener to said beverage.

3. A method according to claim 1, wherein said basidiomycetes fungus and said hydrangea tea used to prepare the starting mixture are in dried form.

4. A method according to claim 1, wherein said fungus and said hydrangea tea are mixed in a ratio of 3:1 to 1:3 on a weight basis.

5. A method according to claim 1, wherein said fungus is Coriolus versicolor or Ganoderma lucidum.

6. A method according to claim 1, wherein said organic acid is added in an amount of 0.1 to 2 wt% of the total composition.

7. A method according to claim 1, wherein said extract is allowed to stand at a temperature of 0° to 10° C. for more than 10 hours to allow said insoluble matter to precipitate.

8. A beverage obtained by the method of claim 1.

9. A method for the preparation of a beverage which consists essentially of the steps of:

mixing (1) basidiomycetes fungus of the family Polyporaceae and containing polysaccharides and organic germanium substances, with (2) hydrangea tea, wherein said fungus and said tea are mixed in a ratio in the range of 3:1 to 1:3 on a weight basis, whereby to prepare a starting mixture;

adding water to said starting mixture in an amount in the range of 5 to 20 times by weight of the total weight of said starting mixture whereby to obtain an aqueous mixture;

heating said aqueous mixture at a temperature in the range of 50° C. to 150° C. for a time period sufficient to extract water-soluble substances comprising polysaccharides and organic germanium compounds from said fungus and said tea;

filtering said mixture to remove solids therefrom and thereby obtain an aqueous extract of said fungus and said tea;

adding to said aqueous extract from 0.1 to 2 wt.%, based on the total weight of said extract, of an organic acid which is physiologically harmless to human beings in order to reduce the pH of said aqueous extract to less than 5;

allowing said extract to stand at a temperature in the range of 0° C. to 10° C. for a period of at least 10 hours, thereby precipitating insoluble matter from said extract;

removing said precipitated insoluble matter from said extract; and heating said extract to thermally sterilize said extract, thereby forming said beverage.

10. A method as claimed in claim 9, wherein said fungus is *Coriolus versicolor*.

11. A method as claimed in claim 9, wherein said fungus is *Ganoderma lucidum*.

12. A method as claimed in claim 9, wherein said organic acid is selected from the group consisting of citric acid, l-ascorbic acid, succinic acid, and mixtures thereof.

13. A method as claimed in claim 9, wherein said precipitated insoluble matter is removed from said extract by centrifuging said extract at a speed in the range of 8,000 to 20,000 rpm.

14. A beverage obtained by the method of claim 9.

* * * * *